UNITED STATES PATENT OFFICE.

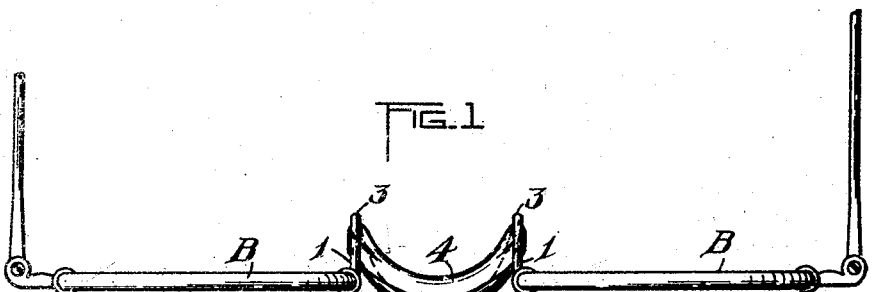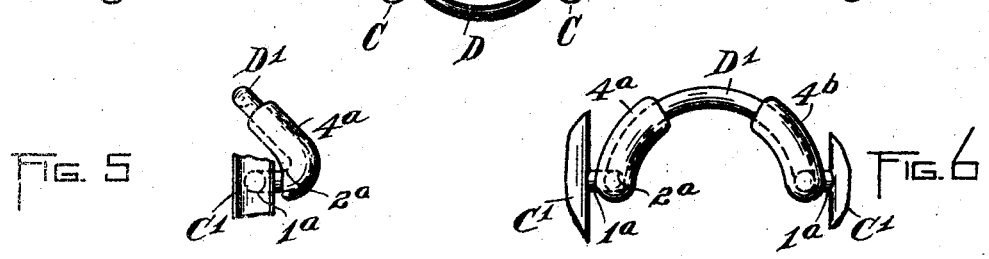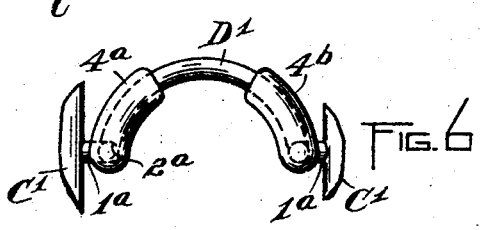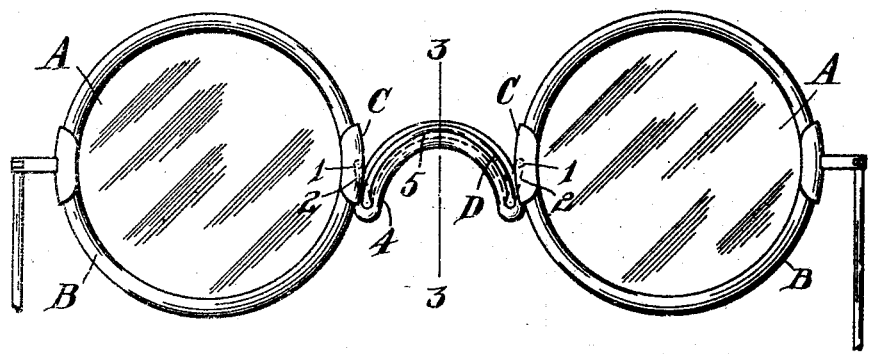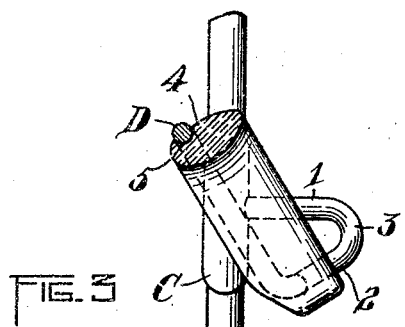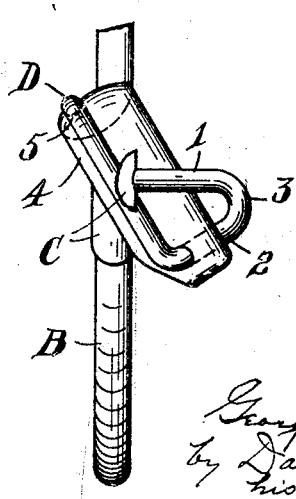

GEORGE H. DAY, OF ROCHESTER, NEW YORK, ASSIGNOR TO E. KIRSTEIN SONS COMPANY, OF ROCHESTER, NEW YORK, A CORPORATION OF NEW YORK.

OPHTHALMIC MOUNTING.

1,348,155. Specification of Letters Patent. Patented Aug. 3, 1920.

Application filed August 5, 1918. Serial No. 248,248.

*To all whom it may concern:*

Be it known that I, GEORGE H. DAY, a citizen of the United States, and resident of Rochester, in the county of Monroe and State of New York, have invented certain new and useful Improvements in Ophthalmic Mountings, of which the following is a specification.

The present invention relates to ophthalmic mountings, and an object thereof is to provide a durable and inexpensive manner of mounting nose bearing means on the nose bridging portion of a mounting without interfering with the adjustment of the mounting for obtaining different pupilary distances between the lenses.

To this and other ends the invention consists of certain parts and combinations of parts, all of which will be hereinafter described, the novel features being pointed out in the appended claims.

In the drawings:—

Figure 1 is a plan view of a mounting embodying the present invention;

Fig. 2 is a front view of the same embodiment;

Fig. 3 is a section on the line 3—3, Fig. 2;

Fig. 4 is a view of the mounting with one of the lens-attaching devices broken away to show the nose pad of Fig. 1 in side elevation;

Fig. 5 is a detail view of another embodiment of the invention in which the nose pad is formed of two sections; and Fig. 6 is a rear view of the embodiment shown in Fig. 5.

It has been suggested to place one or more nose pads on the nose bridging portion of ophthalmic mountings, but the constructions heretofore designed have not been permanently attached or have been complicated, requiring separate fastening devices, or complicated bridges. According to this invention there is employed nose bearing means either in one or two pads which does not require a complicated, specially-formed bridge, does not require separate fastening devices, and while being permanently secured in place does permit a relative adjustment between the lens-attaching devices to adapt the mounting for eyes of different pupilary distances. The invention also provides a construction which may be readily made from xylonite, celluloid, or similar material, so that it may be made to match lens frames of the lens-attaching devices made from the same material.

In the embodiment of the invention shown in Figs. 1 to 4, A indicates the lenses surrounded by the lens frame B of xylonite or the like of the lens-attaching devices which, in this instance, also include the frame mounts or clamps C of any suitable construction. The lens attaching devices connect with a bridging portion D by means of pliable arms 1 extending forwardly from the rear ends of laterally or rearwardly-deflected portions 2 at the ends of the bridging portion D, the pliable arms being connected to the portions 2 by bends 3. In this instance, the bridging portion D lies in a plane at a slight angle to the plane of the lenses, and the portions 2 proceed upwardly and rearwardly therefrom to connect with the lower arms of the bends 3. From the upper arms of the bends 3, the pliable arms 1 proceed forwardly and connect at their outer ends to the clamps C.

The nose pad 4 may be made of any suitable material but, in this instance, it is made of xylonite, celluloid, or the like. This pad lies under the bridging portion D and is of greater width than the bridging portion, its lower surface conforming to the taper of the nose pad, its upper surface being formed with a groove 5 in which the bridging portion is received. Near its lower ends, the pad 4 is provided with openings through which the laterally-extending portions 2 extend. The bridging portion D with the laterally-extending portions 2 engage the pad in such a manner that all movement of the pad is prevented on the mounting.

In the embodiment of the invention shown in Figs. 5 and 6, the bridging portion D' connects with the lens attaching devices C' by pliable arms 1$^a$ which connect with the bridging portion D' by bends 2$^a$ and proceed outwardly from such bridging portion. The nose bearing means in this instance comprises two pads 4$^a$ and 4$^b$. These pads are preferably made of celluloid, xylonite, or similar material, and are preferably molded about the bridging portion D' to surround the same adjacent its ends and also to cover the bends 2$^a$, leaving the pliable arms 1$^a$ for lateral adjustment so that the pupilary distance of the mounting may be varied.

In both embodiments of the invention the metallic bridging portion is held out of engagement with the nose by non-metallic nose-engaging means which is permanently connected to the metallic bridging portion, while leaving pliable portions of the mounting beyond the bridging portion free for adjustment. Furthermore, in both forms the non-metallic portions extend on to laterally-extending portions at the ends of the bridging portions so that turning of the non-metallic parts on the metallic parts is prevented.

What I claim as my invention and desire to secure by Letters Patent is:—

1. An ophthalmic mounting comprising a bridging portion, laterally deflected portions at the ends of the bridging portions, and a composition nose pad lying under the bridging portion and molded about said laterally deflected portion to permanently secure the pad to the mounting.

2. An ophthalmic mounting comprising a bridging portion, rearwardly deflected portions at the ends of the bridging portion, forwardly extending arms of pliable material extending from the rearwardly deflected portions, a composition nose pad lying under said bridging portion and molded about the rearwardly deflected portions to permanently secure the pad to the mounting, and lens attaching devices carried by said forwardly extending pliable arms.

3. An ophthalmic mounting comprising a bridging portion, laterally deflected portions at the ends of the bridging portion, and a composition nose pad bridging the nose and having a groove snugly receiving the bridging portion and having openings at its ends through which the laterally deflected portions extend to maintain the bridging portion in the groove.

4. In an ophthalmic mounting having a bridging portion and laterally deflected portions at the ends of the bridging portion; a composition nose pad lying under said bridging portion and molded about at least one of the laterally deflected portions to permanently secure the pad against movement on the mounting.

GEORGE H. DAY.